United States Patent
Tricoukes et al.

(10) Patent No.: US 8,908,043 B2
(45) Date of Patent: Dec. 9, 2014

(54) SYSTEM AND METHOD FOR LOCATION-BASED OPERATION OF A HEAD MOUNTED DISPLAY

(75) Inventors: Nicole Tricoukes, Seaford, NY (US); Patrick Riechel, Briarwood, NY (US); Tom Roslak, Northport, NY (US)

(73) Assignee: Symbol Technologies, Inc., Holtsville, NY (US)

(*) Notice: Subject to any disclaimer, the term of this patent is extended or adjusted under 35 U.S.C. 154(b) by 1004 days.

(21) Appl. No.: 12/758,265

(22) Filed: Apr. 12, 2010

(65) Prior Publication Data

US 2011/0249122 A1    Oct. 13, 2011

(51) Int. Cl.
   H04N 7/18      (2006.01)
   G06F 1/16      (2006.01)
   G06F 3/01      (2006.01)
   G02B 27/01     (2006.01)

(52) U.S. Cl.
   CPC ............. *G02B 27/017* (2013.01); *G06F 1/163* (2013.01); *G06F 3/011* (2013.01); *G02B 2027/014* (2013.01); *G02B 2027/0138* (2013.01); *G02B 2027/0187* (2013.01)
   USPC ................ 348/158; 348/14.02; 348/14.16; 348/94

(58) Field of Classification Search
   None
   See application file for complete search history.

(56) References Cited

U.S. PATENT DOCUMENTS

| | | | | |
|---|---|---|---|---|
| 5,991,085 | A * | 11/1999 | Rallison et al. | 359/630 |
| 7,432,879 | B2 * | 10/2008 | Schonlau | 345/8 |
| 8,009,229 | B1 * | 8/2011 | Peterson | 348/376 |
| 8,335,400 | B2 * | 12/2012 | Kobayashi | 382/276 |
| 2009/0018419 | A1 * | 1/2009 | Torch | 600/318 |
| 2009/0086015 | A1 * | 4/2009 | Larsen et al. | 348/46 |
| 2009/0189974 | A1 * | 7/2009 | Deering | 348/46 |
| 2009/0243970 | A1 * | 10/2009 | Kato et al. | 345/8 |
| 2009/0278766 | A1 * | 11/2009 | Sako et al. | 345/8 |
| 2010/0053069 | A1 * | 3/2010 | Tricoukes et al. | 345/156 |
| 2010/0308999 | A1 * | 12/2010 | Chornenky | 340/573.1 |
| 2010/0328344 | A1 * | 12/2010 | Mattila et al. | 345/633 |

OTHER PUBLICATIONS

Tricoukes, N., et al., Technology Innovation the Future of Handsfree Mobility Head-Mounted Displays, Motorola Enterprise Mobility Solution, 2009.

* cited by examiner

*Primary Examiner* — Djenane Bayard

(57) ABSTRACT

A location-based operating method for a head mounted display apparatus is provided. The method can be performed by one or more components of a mobile computing system and remote computing systems. The method obtains location data corresponding to the head mounted display apparatus, and processes the location data to determine a geographic position of the head mounted display apparatus. The method continues by controlling display characteristics of the head mounted display apparatus in response to the geographic position of the head mounted display apparatus.

13 Claims, 7 Drawing Sheets

SYSTEM AND METHOD FOR LOCATION-BASED OPERATION OF A HEAD MOUNTED DISPLAY

TECHNICAL FIELD

Embodiments of the subject matter described herein relate generally to mobile computing devices. More particularly, embodiments of the subject matter relate to mobile head mounted display units.

BACKGROUND

Mobile computing devices and related display technologies are well known. A mobile computing device could include or cooperate with a head mounted display unit that provides a physically compact display element that is held within close proximity to the user's eye. A head mounted display unit could be used to provide image content to the user in situations where it would be impractical to carry or otherwise utilize a traditional display monitor. A head mounted display unit can provide a very small physical display element that appears to the user as a virtual image of a full size video monitor. Due to their mobility, usability, and portability, head mounted display units are becoming increasingly popular in certain applications (e.g., advanced military weapons platforms, virtual reality systems, service, construction, and architecture). A virtual image provided by a head mounted display unit can also be employed as a graphical user interface for a mobile computing device, cooperating with voice commands and/or physical user interface features.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 1:
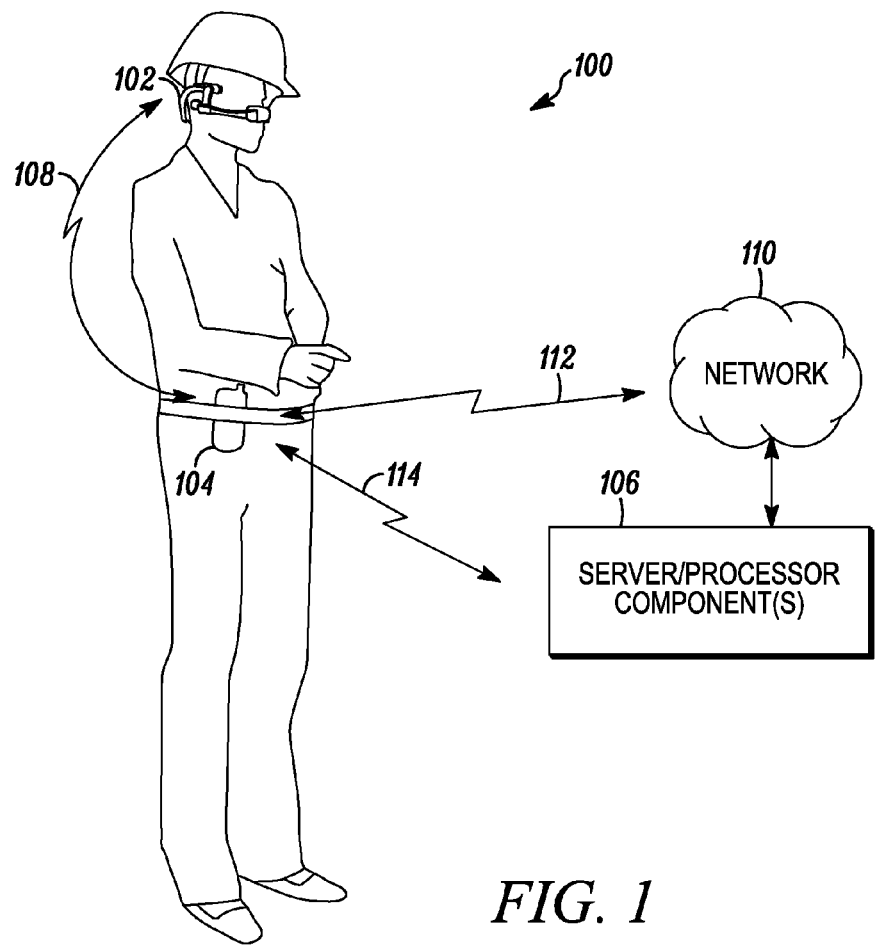
FIG. 1 is a schematic representation of an exemplary embodiment of a mobile computing system.
Figure 2:
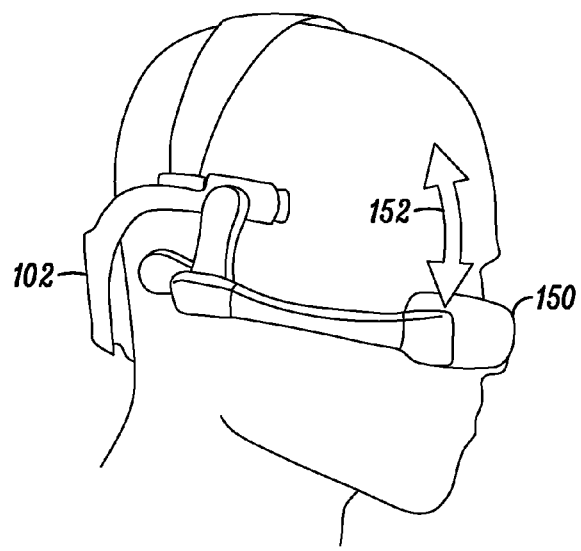
FIG. 2 is a perspective view of an exemplary embodiment of a head mounted display unit suitable for use in the mobile computing system shown in FIG. 1.

FIG. 1 is a schematic representation of an exemplary embodiment of a mobile computing system 100 having a head mounted display (HMD) unit 102, a mobile computing device 104, and a remote component 106. FIG. 2 is a perspective view of the HMD unit 102 as it appears on the head of a user. The HMD unit 102 cooperates and communicates with the mobile computing device 104, preferably using a wireless data communication link 108. The mobile computing device 104 cooperates with and communicates with the remote component 106. In certain embodiments, the mobile computing device 104 communicates with the remote component 106 via a data communication network 110, preferably using a wireless data communication link 112. Alternatively (or additionally), the mobile computing device 104 could communicate directly with the remote component 106, preferably using a wireless data communication link 114. Moreover, although not depicted in FIG. 1, the HMD unit 102 may be configured to support wireless data communication with the remote component 106 (directly or via the data communication network 110).

In certain embodiments, the HMD unit 102 is physically distinct and physically separate from both the mobile computing device 104 and the remote component 106. In other embodiments, the HMD unit 102 could be a "dumb" component that is tethered to or otherwise communicates with the processor of the mobile computing device 104. The physical platform of the HMD unit 102 may be similar to products offered by Motorola, Inc., Kopin Corporation, Inc., or other manufacturers. Referring to FIG. 2, the HMD unit 102 includes a boom-mounted display element 150 that is located in front of the user's eye. The display element 150 can be pivoted up and away from the user's eye if so desired (as indicated by the arrow 152 in FIG. 2).

In certain implementations, the mobile computing device 104 is physically distinct and physically separate from both the HMD unit 102 and the remote component 106. The mobile computing device 104 is suitably configured such that it can be worn or carried by the user. In practice, the mobile computing device 104 may be implemented using any of a plurality of different portable device platforms, including, without limitation: a personal digital assistant; a cellular telephone; a smart phone; a handheld, netbook, notebook, laptop, or tablet computer; a digital media player; a videogame device; a radio frequency identification (RFID), image, or barcode scanner; or the like. In certain embodiments, handheld mobile computer devices available from Motorola, Inc. could be utilized for the mobile computing device 104 (for example, one or more of the following model numbers may be suitable: MC3100, MC9500-K, MC75, MC55, MC1000, MC3000, MC70, MC9090-G, and MC909X).

The remote component 106 is physically distinct and physically separate from both the HMD unit 102 and the mobile computing device 104. As described in more detail below with reference to FIG. 3, the remote component 106 includes or cooperates with at least one processor that is operatively associated with the mobile computing device 104. In this regard, the remote component 106 may be considered to be a server component or a processor component for the mobile computing system 100.

In typical deployments, the remote component 106 is remotely located relative to the user, the HMD unit 102, and the mobile computing device 104 and, therefore, the data communication network 110 can facilitate data communication between the remote component 106 and the mobile computing device 104. The data communication network 110 may be any digital or other communications network capable of transmitting data between senders and receivers. In various embodiments, the data communication network 110 includes any number of public or private data connections, links, or architectures supporting any number of communications protocols. In this regard, the data communication network 110 may include the Internet, for example, or any other network based upon TCP/IP or other conventional protocols. In various embodiments, the data communication network 110 also incorporates a wireless and/or wired telephone network, such as a cellular communications network for communicating with mobile phones, personal digital assistants, and/or the like. Moreover, the data communication network 110 may also incorporate any sort of wireless or wired local area network, such as one or more IEEE 802.3 and/or IEEE 802.11 networks, and/or it may utilize short range wireless technology (such as Bluetooth).

In some deployments, the remote component 106 is physically located within close proximity to the user, the HMD unit 102, and the mobile computing device 104. For such deployments, it may be possible to have direct wireless data communication between the mobile computing device 104 and the remote component 106. For example, the wireless data communication link 114 may be established and maintained in accordance with Bluetooth technology.

Figure 3:
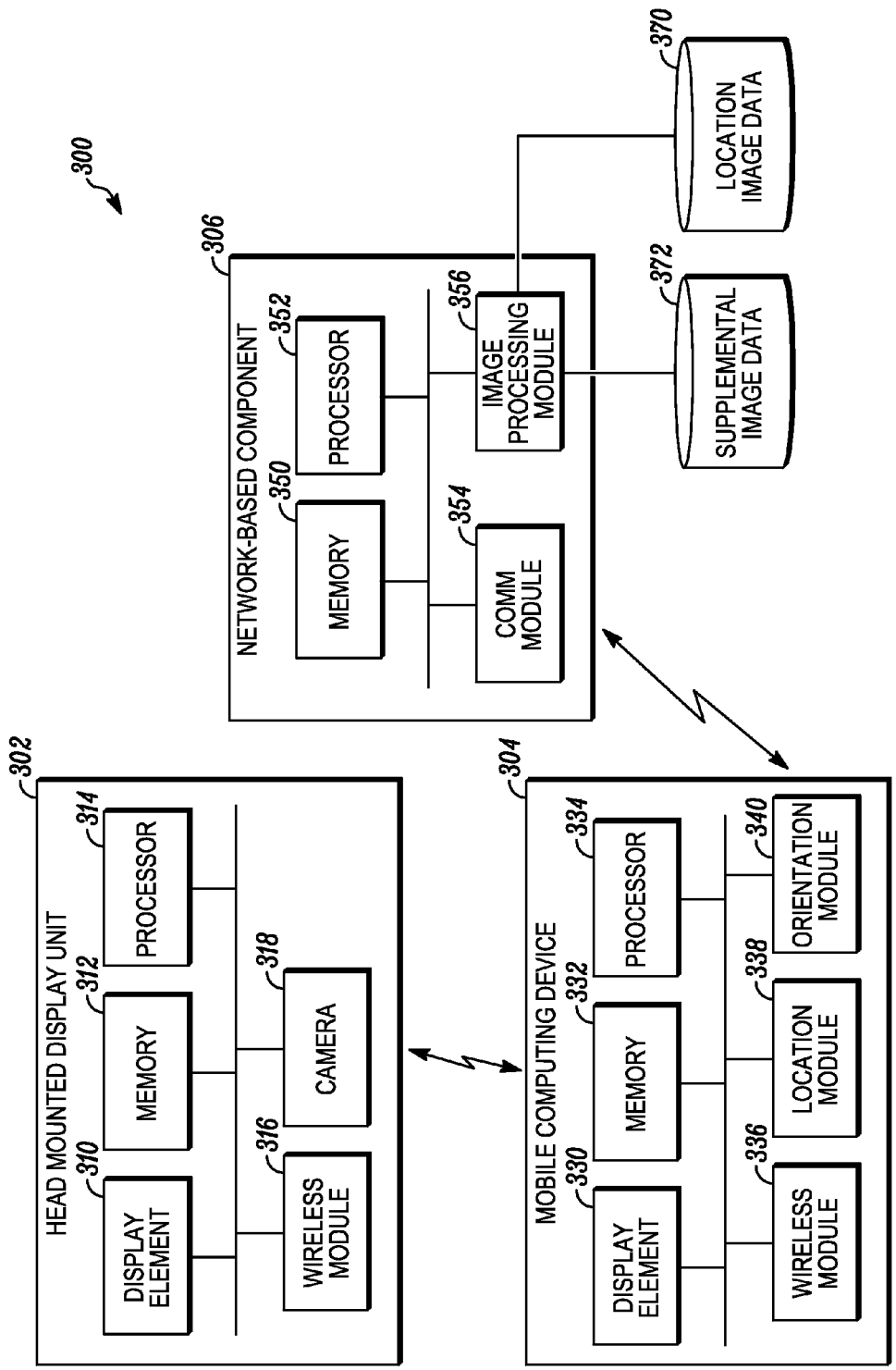
FIG. 3 is a schematic block diagram of an exemplary embodiment of a mobile computing system.

FIG. 3 is a schematic block diagram of an exemplary embodiment of a mobile computing system 300 that includes an HMD unit 302, a mobile computing device 304, and a network-based component 306. The mobile computing system 300 represents one possible implementation of the mobile computing system 100 depicted in FIG. 1. The illustrated embodiment of the HMD unit 302 generally includes, without limitation: a display element 310; an appropriate amount of memory 312; at least one processor 314; a wireless module 316; and a camera 318. The depicted embodiment of the mobile computing device 304 generally includes, without limitation: a display element 330; an appropriate amount of memory 332; at least one processor 334; a wireless module 336; a location module 338; and an orientation module 340. The illustrated embodiment of the network-based component 306 generally includes, without limitation: a suitable amount of memory 350; at least one processor 352; a communication module 354; and an image processing module 356. It should be appreciated that FIG. 3 depicts the components of the mobile computing system 300 in a simplified manner, and that actual embodiments of the system components will include additional elements, features, hardware, and/or processing logic associated with conventional functionality and/or associated with functionality that is unrelated to the subject matter described here.

As mentioned above with reference to FIG. 1, the HMD unit 302 is configured to be worn on the head of a user, and the display element 310 is relatively compact in size. The particular size, shape, resolution, and type of display technology utilized for the display element 310 can be selected to suit the needs and requirements of the specific HMD unit 302 and/or to suit the needs and requirements of the desired application. In this regard, the display element 310 may be, for example, a liquid crystal display (LCD) element of the type described in United States Patent Application Publication 2010/0053069 A1 (the relevant content of which is incorporated by reference herein). In alternate embodiments, different display technologies, equipment, and architectures could be utilized, such as: heads-up display technology; near-eye displays; virtual displays; light emitting diode (LED) display technology; flat panel displays; projector display technology; three-dimensional display technology; etc.

The processor 314 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. For example, the processor 314 may represent the primary image/graphics processor of the system 300 (in some embodiments). The processor 314 may be realized as a microprocessor, a controller, a microcontroller, or a state machine. Moreover, the processor 314 may be implemented as a combination of computing devices, e.g., a combination of a digital signal processor and a microprocessor, a plurality of microprocessors, one or more microprocessors in conjunction with a digital signal processor core, or any other such configuration.

The memory 312 may be realized as RAM memory, flash memory, EPROM memory, EEPROM memory, registers, a hard disk, a removable disk, or any other form of storage medium known in the art. In this regard, the memory 312 can be coupled to the processor 314 to enable the processor 314 to read information from, and write information to, the memory 312. In the alternative, the memory 312 may be integral to the processor 314. As an example, the processor 314 and the memory 312 may reside in an ASIC.

In alternate embodiments, the HMD unit 302 is a "dumb" or lightweight component having little or no independent processing capabilities. For such embodiments, the memory 312 and the processor 314 could be eliminated if the HMD unit 302 relies on the memory 332 and the processor 334 of the mobile computing device. For example, the HMD unit 302 could be physically tethered to the mobile computing device or otherwise be in data communication with the processor 334 such that the display element 310 of the HMD unit 302 serves as a remote display of the mobile computing device 304.

The wireless module 316 is configured to support one or more wireless data communication protocols. Depending upon the particular embodiment and system deployment, the wireless module 316 could support wireless data communication with the mobile computing device 304 and/or wireless data communication with the network-based component 306. Any number of suitable wireless data communication protocols, techniques, or methodologies may be supported by the HMD 302, including, without limitation: RF; IrDA (infrared); Bluetooth; ZigBee (and other variants of the IEEE 802.15.4 protocol); IEEE 802.11 (any variation); IEEE 802.16 (WiMAX or any other variation); cellular/wireless/cordless telecommunication protocols; and proprietary wireless data communication protocols. In certain deployments, the wireless module 316 utilizes Bluetooth (or another suitable short range wireless technology) to communicate with the mobile computing device 304. In an embodiment of the HMD unit 302, the wireless module 316 may include or be realized as hardware, software, and/or firmware, such as an RF front end, a suitably configured radio module (which may be a stand alone module or integrated with other or all functions of the device), a wireless transmitter, a wireless receiver, a wireless transceiver, an infrared sensor, an infrared diode and sensor, or the like. Moreover, the wireless module 316 may include or cooperate with one or more antenna arrangements of the HMD unit 302.

The camera 318, which may be coupled to, mounted to, or integrated into the HMD unit 302, is configured to capture images that are used for the purposes described in more detail below. It should be appreciated that the camera 318 is an optional feature that need not be deployed or activated in all embodiments. The camera 318 is positioned and aligned such that it captures images that correspond to or otherwise represent the point of view of the user. As used here, images captured by the camera 318 are referred to as "user images," and the data that conveys a user image is referred to as "user image data." During operation, the camera 318 collects image data at a relatively quick refresh rate such that the user image data is updated quickly (e.g., in real time or substantially real time).

Referring now to the mobile computing device 304, the particular size, shape, resolution, and type of display technology utilized for the display element 330 can be selected to suit the needs and requirements of the particular embodiment of the mobile computing device 304. For example, the mobile computing device 304 may utilize an LCD element of the type commonly used with modern smart phones and other portable electronic devices. The memory 332, the processor 334, and the wireless module 336 of the mobile computing device 304 may be generally configured as described above for their counterparts in the HMD unit 302. In particular embodiments, the processor 334 represents the main image/graphics processor for the mobile computing system 300. Although the processor 334 is integral to the mobile computing device 304, depending upon the manner in which the mobile computing system 300 is implemented, the processor 334 may cooperate with the processor 314 of the HMD unit 302 to support distributed processing techniques and/or to allocate processing tasks between the HMD unit 302 and the mobile computing device 304. The wireless module 336 of the mobile computing device 304 may be configured to support wireless data communication with the HMD unit 302, a data communication network, a remote server-based or network-based component, a wireless network infrastructure component (such as a wireless access point), or the like.

The location module 338 may be implemented using any suitable combination of hardware, software, firmware, processing logic, etc. The location module 338 is configured to determine the current geographic position of the mobile computing device 304 in an ongoing manner. In certain embodiments, the location module 338 includes or otherwise utilizes a Global Positioning System (GPS) receiver and related technology that obtains and processes GPS data to determine the geographic position of the mobile computing device 304. In other embodiments, the location module 338 could utilize locationing techniques other than GPS, such as, for example: Real Time Locating System (RTLS) technology; RFID technology; and/or triangulation techniques. Notably, the geographic position of the mobile computing device 304 will be a good approximation of the geographic position of the HMD unit 302 whenever the mobile computing device 304 is in close proximity to the HMD unit 302.

The orientation module 340 may be implemented using any suitable combination of hardware, software, firmware, processing logic, etc. The orientation module 340 is configured to determine the physical orientation of the mobile computing device 304 and/or to determine the physical orientation of the HMD unit 302 in an ongoing manner. As used here, "physical orientation" refers to the physical position of a reference axis of the mobile computing device 304 (or a reference axis of the HMD unit 302) relative to some defined coordinate system. For example, the physical orientation of the HMD unit 302 may be specified with reference to an axis that corresponds to the direction in which the user's eyes are pointing. In this regard, the orientation module 340 may be designed to process orientation data that indicates or is otherwise associated with one or more of the following characteristics, parameters, measurements, or status of the HMD unit 302 (or the mobile computing device 304), without limitation: heading or compass direction corresponding to the user's point of view; bearing; attitude; pitch; yaw; and roll. In practice, the orientation module 340 may include or cooperate with items such as, without limitation: a gyroscopic sensor; an accelerometer; force sensors; stress/strain sensors; inertial position sensors; etc.

In practice, the location module 338 and the orientation module 340 (individually or in combination) could determine the position and orientation of the HMD unit 302 and/or the mobile computing device 304 and use that information for the purposes described in more detail below. Moreover, the location module 338 and/or the orientation module 340 could perform dead reckoning using magnetic bearing, obtain projected velocity vectors using software, perform gyroscopic extrapolation using accelerometer technologies, etc. It should be appreciated that FIG. 3 depicts one exemplary embodiment that employs a simple and lightweight HMD unit 302 that leverages the processing capabilities and supplemental functionality of the associated mobile computing device 304. In certain deployments, however, the HMD unit 302 could include a location module and/or an orientation module for determining the geographic position and/or physical orientation of the HMD unit 302 (moreover, in such deployments, the location module 338 and/or the orientation module 340 could be omitted from the mobile computing device 304). Such deployments may provide a better and more direct indication of the physical orientation of the user's eyes, relative to deployments that only determine the physical orientation of the mobile computing device 304.

Regarding the network-based component 306, the memory 350 and the processor 352 may be generally configured as described above for their counterparts in the HMD unit 302. It should be appreciated that the processor 352 could serve as the primary image/graphics processor of the mobile computing system 300 (in some embodiments). Although the processor 352 is integral to the network-based component 306, depending upon the manner in which the mobile computing system 300 is implemented, the processor 352 may cooperate with the processor 314 of the HMD unit 302 and/or the processor 334 of the mobile computing device 304 to support distributed processing techniques and/or to allocate processing tasks between the HMD unit 302, the mobile computing device 304, and the network-based component 306.

The communication module 354 of the network-based component 306 may be configured to support wireless data communication with the HMD unit 302, the mobile computing device 304, a data communication network, another remote component, a wireless network infrastructure component (such as a wireless access point), or the like. Thus, the communication module 354 might support one or more of the wireless communication techniques and protocols described previously, including WLAN and wireless WAN. The communication module 354 may also be configured to support data communication over one or more tangible links. In this regard, the communication module 354 might support data communication over tangible links using technologies such as, and without limitation: Ethernet; universal serial bus (USB); local area network (LAN); and wide area network (WAN).

The image processing module 356 of the network-based component 306 may be implemented using any suitable combination of hardware, software, firmware, processing logic, etc. The image processing module 356 is configured to access, retrieve, and process image data that is correlated to or otherwise associated with geographic position data and/or physical orientation data provided by the mobile computing device 304 (or, in some embodiments, by the HMD unit 302). Accordingly, the network-based component 306 may include or communicate with a database or other source of location image data 370 and/or a database or other source of supplemental image data 372. The relevance of the location image data 370 and the supplemental image data 372 is described below. As explained in more detail below, the image content obtained by the network-based component 306 is influenced by the geographic position of the mobile computing device 304, the physical orientation of the mobile computing device 304, the geographic position of the HMD unit 302 and/or the physical orientation of the HMD unit 302.

Figure 4:
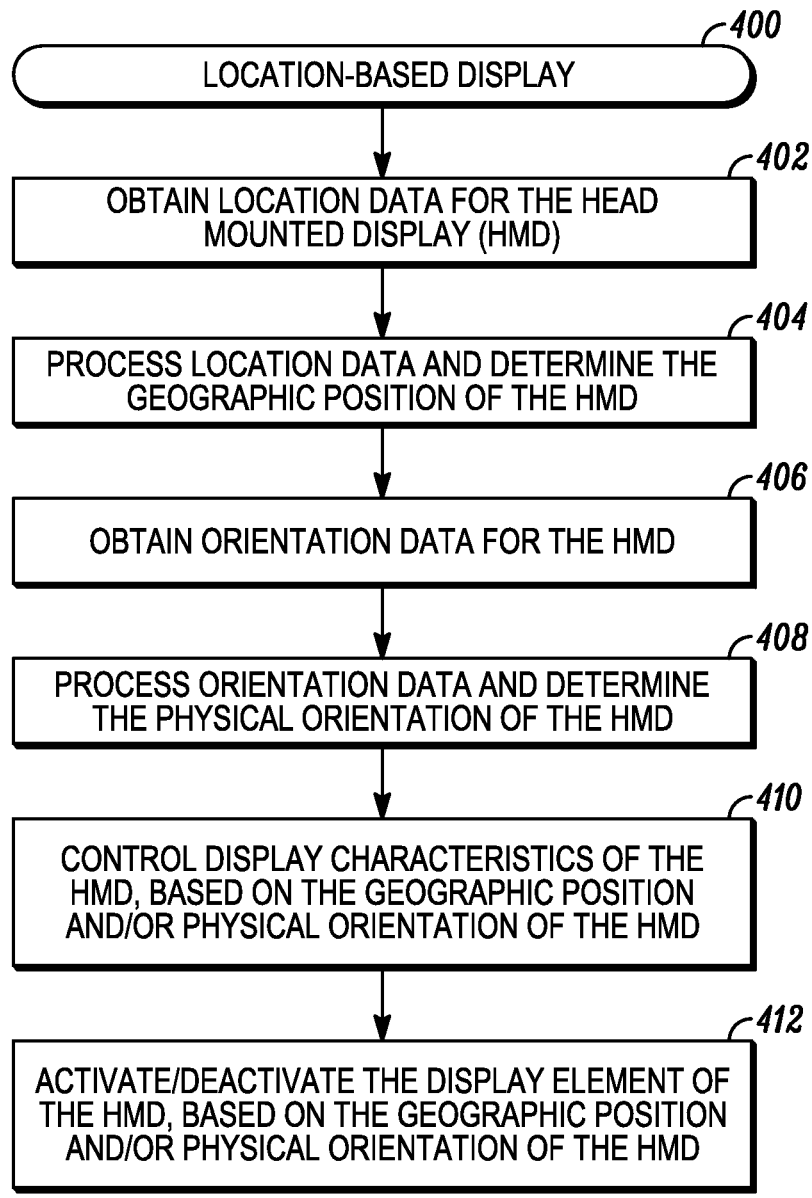
FIG. 4 is a flow chart that illustrates an exemplary embodiment of a location-based display process.

A mobile computing system as described here can carry out various location-based display methods and techniques that leverage the locationing, positioning, and physical orientation determining capabilities of the HMD unit and/or the mobile computing device in the system. For example, FIG. 4 is a flow chart that illustrates an exemplary embodiment of a location-based display process 400 that could be performed by a mobile computing system. The various tasks performed in connection with a process described herein may be performed by software, hardware, firmware, or any combination thereof. For illustrative purposes, a description of a process may refer to elements mentioned above in connection with FIGS. 1-3. In practice, portions of a described process may be performed by different elements of the described system, e.g., an HMD unit, a mobile computing device, or a network or server based component. It should be appreciated that a described process may include any number of additional or alternative tasks, the tasks shown in the figures need not be performed in the illustrated order, and that a described process may be incorporated into a more comprehensive procedure or protocol having additional functionality not described in detail herein. Moreover, one or more of the tasks shown in a figure could be omitted from an embodiment of the associated process as long as the intended overall functionality remains intact.

The process 400 may begin by obtaining location data corresponding to the HMD unit (task 402). Depending upon the manner in which the system is configured, task 402 may obtain location data for the HMD unit itself and/or for a mobile computing device that is within close physical proximity to the HMD unit. As explained above with reference to FIG. 1, the HMD unit and the corresponding mobile computing device will typically be carried or worn by the same user. Therefore, location data for the HMD unit (or for the mobile computing device) will accurately identify the geographic position of the user. The illustrated embodiment of the process 400 continues by processing the obtained location data to determine the current geographic position of the HMD unit (task 404). This example assumes that the location data is GPS data, and that task 404 represents the processing of received GPS data for purposes of obtaining the geographic position (expressed in, for example, GPS coordinates) of the HMD unit.

The process 400 may also obtain orientation data (task 406) for the HMD unit while the HMD unit is being worn by the user. The orientation data conveys or is otherwise indicative of the physical orientation of the HMD unit relative to some predefined reference or coordinate system. Accordingly, the process 400 continues by processing the obtained orientation data to determine the physical orientation of the HMD unit (task 408). For example, task 408 could be executed to determine which compass direction the user is facing, to determine an angle of elevation associated with the user's line of sight, to determine a tilt angle of the user's head, to determine the altitude, or the like. Thus, the mobile computing system can utilize the calculated physical orientation information and the calculated geographic position information to estimate the user's current point of view in a real-time manner. The process 400 may also analyze the location data and/or the orientation data to determine a status, a condition, a characteristic, or other parameter associated with the operation or use of the HMD unit or the mobile computing device. For example, tasks 404, 408 could be performed to determine whether the user is (or has been) in a stationary position, whether the user is travelling at a high speed that is indicative of driving, whether the user is moving at a walking pace, whether the user is at home or at the office, etc.

Figure 5:
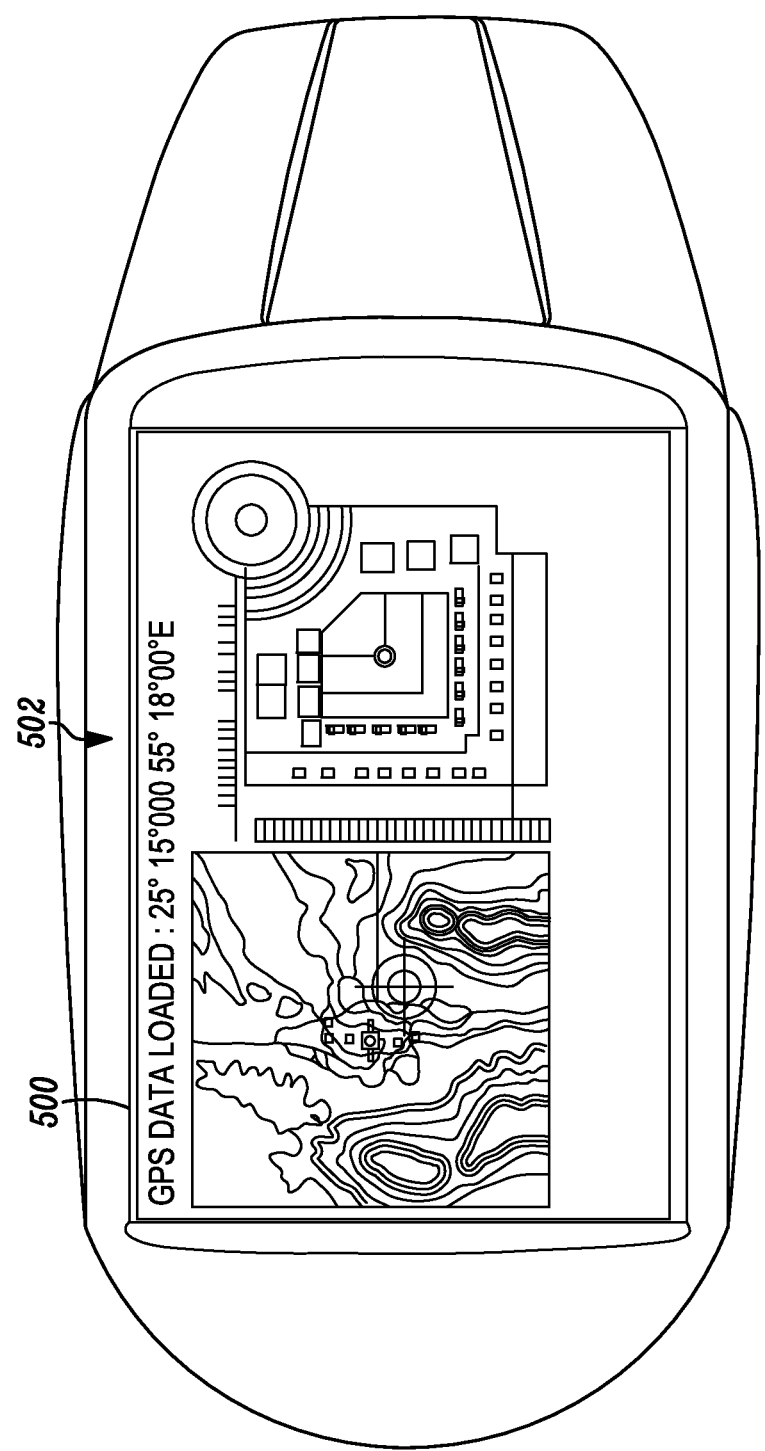
FIG. 5 is schematic representation of an exemplary display image generated by a head mounted display unit.

In certain embodiments, the process 400 controls one or more display characteristics of the HMD unit, based upon the determined geographic position, the determined physical orientation, and/or other calculated parameters associated with the current status of the HMD unit or the mobile computing device (task 410). In this regard, the display characteristics can be controlled in response to the real-time geographic position of the HMD unit and/or in response to the real-time physical orientation of the HMD unit. In practice, the process 400 could obtain location-based image content that is correlated to the determined geographic position, and then render that image content on the display element of the HMD unit. In this regard, FIG. 5 is schematic representation of an exemplary display image 500 that might be generated by an HMD unit. As indicated on the display image 500 itself, the view corresponds to certain GPS coordinates 502 (the geographic position). This particular display image 500 depicts a top view of the identified location (on the left side), along with an architectural drawing (on the right side) corresponding to the identified location. Of course, the actual image content rendered on the HMD unit can vary in real-time, and the image content will depend upon the current location and the particular environment in which the mobile computing system is deployed.

Referring back to FIG. 4, the process 400 may also control the display characteristics of the HMD unit by controlling the activation and deactivation of the display element itself (task 412), where the activation/deactivation is dependent upon the geographic position and/or the physical orientation of the HMD unit. For example, if the process 400 determines that the user is in a location that is unrelated to the particular job or project, then task 412 might deactivate the display element. On the other hand, if the process 400 determines that the user is at a designated worksite, then the task might activate the display element and maintain the activated state until the user leaves that worksite. As another example, if the process 400 determines that the user is operating a vehicle, then task 412 might deactivate the display element.

As described above with reference to FIGS. 1-3, one or more processors that are operatively associated with the HMD unit and/or the mobile computing device are responsible for performing certain data processing, calculating, and data analyzing tasks. In this regard, a processor that performs tasks 404, 408 could be realized as an integral element of the HMD unit, the mobile computing device, or a remote network-based component. If data processing is performed by a remote component such as a server system, then the process 400 might transmit (wirelessly or otherwise) the location data and/or the orientation data from the HMD unit or the mobile computing device to the remote component. After processing the location/orientation data, the remote component can return results, image data, and/or control commands back to the HMD unit or the mobile computing device as needed.

Figure 6:
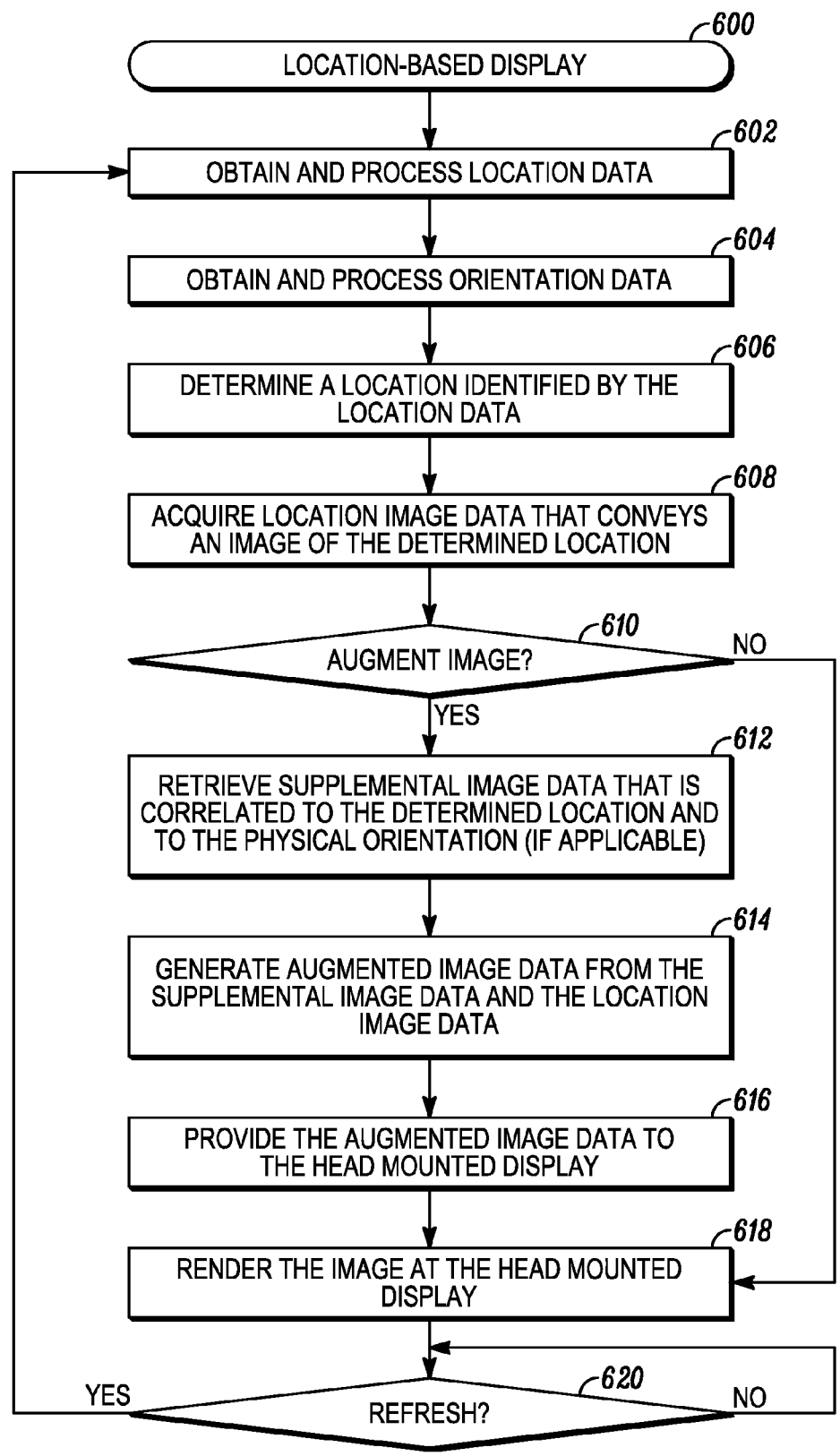
FIG. 6 is a flow chart that illustrates another exemplary embodiment of a location-based display process.

FIG. 6 is a flow chart that illustrates another exemplary embodiment of a location-based display process 600, which may be performed by a mobile computing system. Some of the tasks performed by the process 600 are identical or similar to counterpart tasks performed by the process 400 (see FIG. 4). For this reason, common tasks and functionality will not be redundantly described in detail for the process 600.

This embodiment of the process 600 may begin by obtaining and processing location data (task 602) in the manner described above for the process 400, to determine the current geographic position of the HMD unit and/or the mobile computing device. The process 600 may also obtain and process orientation data (task 604) in the manner described above for the process 400, to determine the physical orientation of the HMD unit and/or the mobile computing device. As used here, location data and orientation data (individually or in combination) represent position data for the HMD unit, because the location and/or orientation data is indicative of the positioning of the HMD unit relative to the surrounding environment. Note that task 604 is optional, and the remainder of the process 600 could be executed even though the exact physical orientation of the HMD unit is unknown.

The process 600 continues by determining a location that is identified, defined, or indicated by the location data (task 606). In practice, task 606 may be associated with the processing of the raw location data to obtain a description of a geographic position, e.g., GPS coordinates. The location determined by task 606 can then be used as a basis for acquiring location image data that conveys an image of the location (task 608). Referring again to FIG. 3, the network-based component 306 may perform task 608 by accessing the location image data 370 and retrieving one or more images that are correlated to the determined location. Furthermore, it is assumed that it is possible to use data caching techniques for images relevant to nearby areas in order to improve system response times. Indeed, image data could be cached at the memory 312 of the HMD unit 302, at the memory of the mobile computing device 304, and/or at the memory of the network-based component 306 (see FIG. 3). In this regard, the process 600 determines and obtains image content that is influenced by the current geographic position of the HMD unit and/or the mobile computing device. As explained above, the retrieved image content may also be influenced by the current physical orientation of the HMD unit and/or the mobile computing device.

The mobile computing system described here can be used as a virtual display system that generates augmented reality images. Accordingly, if the retrieved image content is to be augmented (query task 610), then the process 600 may proceed by accessing and retrieving supplemental image data that is correlated to the determined location and (if applicable) to the determined physical orientation (task 612). Referring again to FIG. 3, the network-based component 306 could perform task 612 by accessing the supplemental image data 372 and retrieving one or more supplemental images as needed. As used here, a "supplemental image" means any image content that will be combined with other image content, superimposed onto other image content, displayed with other image content, used to modify other image content, is modified by other image content, or otherwise enhances any original image content. For example, a supplemental image might convey visual elements that are difficult or impossible to see with the naked eye, visual elements that are hidden from view in reality, or elements that have yet to be implemented in reality. In this regard, a supplemental image might represent or include any of the following visual content, without limitation: a wireframe rendition of a structure to be constructed; a proposed layout of buried pipes, waterways, electrical conduits, or gas lines; and a planned layout of roadways.

For certain applications, it may be necessary to maintain a large amount of location image data and/or a large amount of supplemental image data. The actual amount of image data will depend upon a number of factors such as the desired geographic resolution, the number of different physical orientations contemplated, whether or not the location image data will be augmented, the desired level of visual precision, etc. For example, there may be any number of location images corresponding to one geographic position as defined by a set of GPS coordinates; these location images could convey any specific user viewpoint. Likewise, there could be any number of associated supplemental images for each geographic position. Accordingly, exemplary embodiments could employ network-based data storage systems that can handle large amounts of image data, along with high speed network data communication technologies that facilitate quick and reliable transmission of image data to the HMD unit and/or the mobile computing device.

After retrieving the supplemental image data, the process 600 can generate augmented image data from the location image data and the corresponding supplemental image data (task 614). Referring to FIG. 3, the image processing module 356 of the network-based component 306 (and/or other processor components located in the mobile computing system) might be responsible for performing task 614. In this regard, task 614 may employ any number of techniques and technologies related to image processing, graphics manipulation, image alignment, image resizing, image reorientation, and the like. For example, task 614 could perform edge and/or feature identification and alignment such that certain features in the location image are aligned with corresponding features in the supplemental image. Image alignment in this manner is desirable when the supplemental image content represents an overlay for the location image. As another example task 614 might add arrows or text to appropriate parts of the image to effectively "annotate" reality. For this example, the arrows or text may be considered to be part of the supplemental image data itself, or it may be considered to be content that is distinct from the supplemental image data, but used to produce the augmented image data.

The augmented image data includes contributions from both the original location image data and the supplemental image data. Moreover, the augmented image data will be influenced by the current geographic position and (in some instances) the current physical orientation of the HMD unit and/or the mobile computing device. The process 600 may continue by providing the augmented image data to the HMD unit (task 616) using any suitable data communication technology. For the exemplary system depicted in FIG. 3, the network-based component 306 transmits the augmented image data to the mobile computing device 304, which then wirelessly transmits the augmented image data to the HMD unit 302 for rendering on its display element 310. In an alternate system embodiment, the augmented image data is generated by the mobile computing device 304 rather than the network-based component 306. In yet another system embodiment, the augmented image data is created by the HMD unit 302 and, therefore, the augmented image data need not be routed from another component to the HMD unit 302.

The HMD unit renders the augmented image data at its display element (task 618) in a manner that enables the user to view the augmented image content. Referring back to query task 610, if the location image data is not to be augmented, then task 618 will instead render the non-augmented original location image content. The process 600 can be performed in a virtually continuous manner at a relatively high refresh rate. For example, iterations of the process 600 could be performed quickly such that the display of the HMD unit will be updated in real-time or substantially real time in a dynamic manner. Thus, if it is time to refresh the display (query task 620), then the process 600 leads back to task 602 to obtain the most current data. If not, then the current state of the display is maintained. The relatively high refresh rate of the process 600 results in a relatively seamless and immediate updating of the display.

Figure 7:
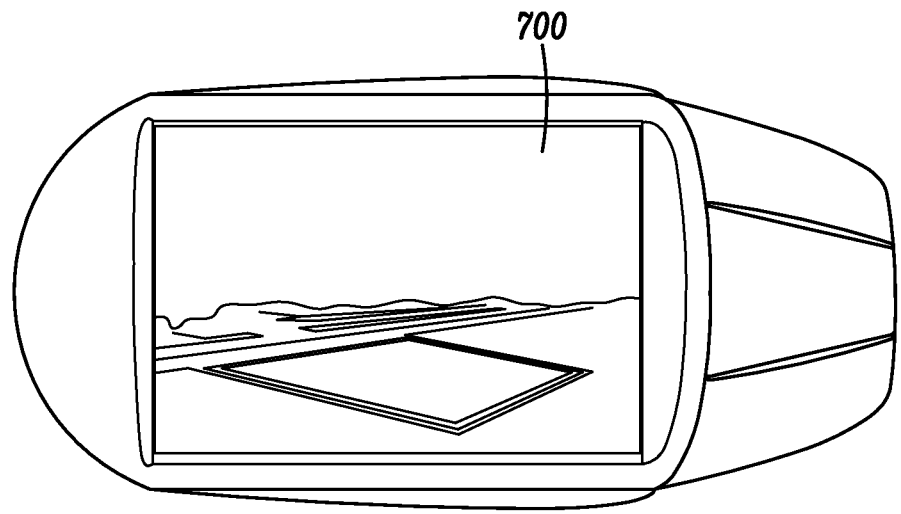
FIG. 7 is a schematic representation of another exemplary display image generated by a head mounted display unit.
Figure 8:
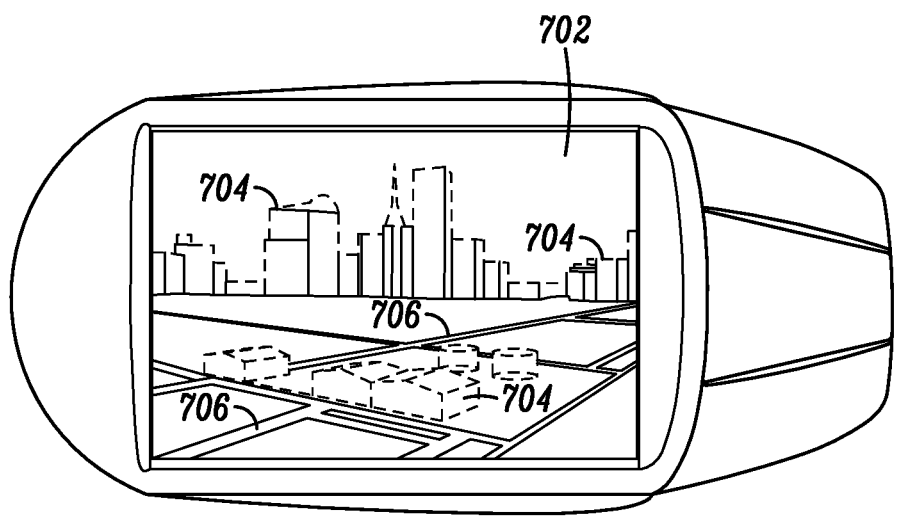
FIG. 8 is a schematic representation of an augmented version of the display image shown in FIG. 7.

FIG. 7 is a schematic representation of an exemplary display image 700 generated by a head mounted display unit, and FIG. 8 is a schematic representation of an augmented display image 702, which corresponds to an augmented version of the display image 700. These two display images 700, 702 correspond to the same point of view (physical orientation) at the same geographic position. The display image 700 corresponds to an original location image that captures the actual physical location at some point in the recent past. Accordingly, the display image 700 approximates the actual view of the user standing at the particular GPS coordinates. The augmented display image 702, however, represents a modified version of the display image 700. The augmented display image 702 includes aligned overlay images that depict proposed features (e.g., planned structures or features to be constructed). For example, the augmented display image 702 includes wireframe structures 704 and a pipeline layout 706, neither of which are actually present or visible in reality. The wireframe structures 704 and pipeline layout 706, however, are rendered in a manner that indicates their relationships and physical orientations relative to the actual existing features/structures in the landscape. In other words, content of the display image 700 has been blended with supplemental image content corresponding to the wireframe structures 704 and the pipeline layout 706. Of course, the actual image content rendered on the HMD unit can vary in real-time, and the image content will depend upon the current location and the particular environment in which the mobile computing system is deployed.

Figure 9:
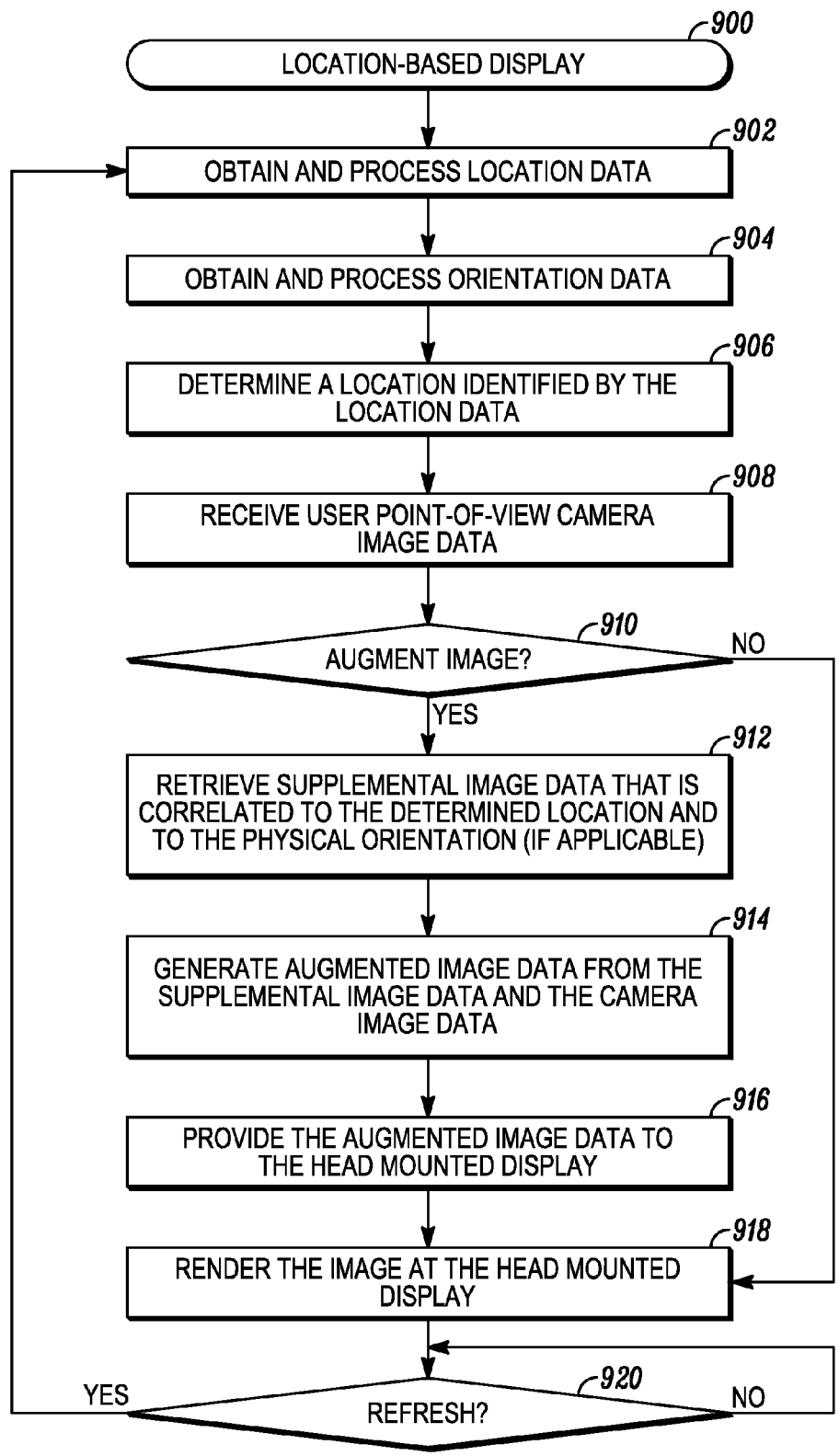
FIG. 9 is a flow chart that illustrates yet another exemplary embodiment of a location-based display process.

FIG. 9 is a flow chart that illustrates yet another exemplary embodiment of a location-based display process 900, which may be performed by a mobile computing system. Some of the tasks performed by the process 900 are identical or similar to counterpart tasks performed by the process 400 (see FIG. 4) and/or the process 600 (see FIG. 6). For this reason, common tasks and functionality will not be redundantly described in detail for the process 900.

Tasks 902, 904, 906 of the process 900 are the same as their counterpart tasks 602, 604, 606 of the process 600. The process 900 also receives user image data for a user image that represents a point of view of the user wearing the HMD unit (task 908). In other words, the user image corresponds to the actual view as perceived by the user at that time. For this embodiment, the user image data is captured by a digital camera mounted to or integrated into the HMD unit. If the user image data is not to be augmented (query task 910), then the process 900 can render the user image at the HMD unit (task 918). If, however, the user image data is to be augmented, then the process 900 generates and renders an augmented image at the display element of the HMD unit, in a manner that is similar to that described above for the process 600. In this regard, tasks 912, 914, 916, 918, 920 of the process 900 are identical or similar to their counterpart tasks 612, 614, 616, 618, 620 of the process 600. In contrast to the process 600, however, the process 900 augments the user image data that has been captured by the camera. Consequently, the resulting augmented image content is based upon a real-time and accurate image of reality. In other words, the augmented image content will be influenced by the user image data and the supplemental image data.

If a network-based component generates the augmented image data (task 914), then the HMD unit and/or the mobile computing device will send the user image data to the network-based component for image processing, and the network-based component will transmit the augmented image data back to the mobile computing device and/or the HMD unit. In alternate embodiments where the augmented image data is generated by the mobile computing device or the HMD unit, the user image data need not be transmitted to a remote component for processing.

The techniques and technologies described above are particularly suitable for use with HMD units that are not equipped with integrated WAN or wireless local area network (WLAN) connectivity, GPS functionality, and sensors for determining physical orientation. An adjunct mobile computing device in wireless communication with an HMD unit can be used to find, sense, and control a user's display environment, and to send command and control instructions to remote virtual image display systems to help locate, track, and communicate with remote users. The HMD display element can be controlled (e.g., activated or deactivated) based upon the user's geographic position, bearing, speed of travel, etc., as detected by the mobile computing system. Moreover, the geographic position and physical orientation of the HMD unit can be determined or approximated by the mobile computing system, and such position and orientation information can be used to provide accurate location-based image content to the HMD display. In certain embodiments, the position and orientation information can be used to provide augmented image content to the user, for purposes of reality augmentation.

In certain embodiments of the described system, the HMD unit represents a lightweight or "dumb" display component for the mobile computing device and/or for a remote network-based component. In such embodiments, the HMD unit could be tethered to or otherwise linked to the mobile computing device, which remains responsible for determining or estimating the geographic position and/or physical orientation of the HMD unit, retrieving and processing relevant image data, and driving the display element of the HMD unit. In such embodiments, the HMD unit need not include its own processor, memory, or display driver.

In certain implementations of the described system, the HMD unit includes additional functionality such as its own wireless WAN or WLAN subsystem, a GPS receiver, an orientation module, or the like. In such implementations, some or all of the functionality of the mobile computing device (described above) could be ported to the HMD unit itself. Indeed, it may be possible to omit the mobile computing device altogether if the HMD unit is a "full featured" component.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A location-based operating method for a head mounted display apparatus, the method comprising:
    obtaining orientation data for the head mounted display apparatus with an orientation sensor while the head mounted display apparatus is being worn by a user;
    processing the orientation data with a processor to determine a physical orientation of the head mounted display apparatus;
    obtaining location data corresponding to the head mounted display apparatus with a Global Positioning System;
    processing the location data with the processor to determine a geographic position of the head mounted display apparatus; and
    controlling display characteristics of a display element of the head mounted display apparatus with the processor in response to the geographic position and the physical orientation of the head mounted display apparatus, wherein the controlling the display characteristics includes controlling activation and deactivation of the display element of the head mounted display apparatus.

2. The method of claim 1, wherein the obtaining step obtains Global Positioning System data at a mobile computing device that is in close physical proximity to the head mounted display apparatus.

3. The method of claim 1, wherein controlling display characteristics with the processor reduces information displayed on the display element of the head mounted display apparatus.

4. The method of claim 1, wherein controlling display characteristics comprises:
    determining image content that is influenced by the geographic position of the head mounted display apparatus; and
    wirelessly transmitting data that conveys the image content to the head mounted display apparatus for rendering on its display element.

5. The method of claim 1, wherein controlling display characteristics comprises:
    acquiring location image data that conveys an image of a location identified by the location data;
    retrieving supplemental image data that is correlated to the location;
    generating augmented image data from the supplemental image data and the location image data; and
    providing the augmented image data to the head mounted display apparatus for rendering on its display element.

6. The method of claim 1, wherein:
    the step of obtaining location data is performed by a mobile computing device that is in close physical proximity to the head mounted display apparatus; and
    the method further comprises the step of wirelessly transmitting the location data from the mobile computing device to a network-based processing component for processing the location data.

7. A mobile computing display system comprising:
    a head mounted display apparatus configured to be worn on the head of a user, the head mounted display apparatus comprising a display element and an orientation sensor for determining a physical orientation of the head mounted display apparatus;
    a mobile computing device configured to be worn or carried by the user, and configured to support data communication with the head mounted display apparatus, the mobile computing device comprising a Global Positioning System module that determines a geographic position of the mobile computing device; and
    a processor operatively associated with the mobile computing device and configured to determine image content that is influenced by the geographic position and the physical orientation of the mobile computing device, the mobile computing device being configured to transmit data that conveys the image content to the head mounted display apparatus for rendering on the display element, wherein the processor is configured to control display characteristics of the display element of the head mounted display apparatus in response to the geographic position and the physical orientation of the mobile computing device, wherein controlling the display characteristics includes controlling activation and deactivation of the display element of the head mounted display apparatus.

8. The mobile computing display system of claim 7, the processor being integral to the mobile computing device.

9. The mobile computing display system of claim 7, further comprising a network-based server component configured to support data communication with the mobile computing device, the processor being integral to the server component.

10. The mobile computing display system of claim 7, wherein the processor is configured to acquire location image data that conveys an image of a location corresponding to the geographic position and the physical orientation, retrieve supplemental image data that is correlated to the geographic position and the physical orientation, and generate the image content from the supplemental image data and the location image data.

11. The mobile computing display system of claim 7, further comprising a camera configured to capture user image data for a user image that represents a point of view of the user, the image content being influenced by the user image data.

12. A location-based operating method for a head mounted display apparatus having a display element, the method comprising:

obtaining orientation data for the head mounted display apparatus with an orientation sensor while the head mounted display apparatus is being worn by a user;

obtaining location data for the head mounted display apparatus with a Global Positioning System;

receiving user image data for a user image that represents a point of view of a user of the head mounted display apparatus;

controlling display characteristics including activation and deactivation of the display element of the head mounted display apparatus in response to a geographic position and a physical orientation of the head mounted display apparatus;

retrieving supplemental image data that is correlated to the location data, the orientation data and the user image data;

generating augmented image data from the supplemental image data and the user image data; and providing the augmented image data to the head mounted display apparatus for rendering on the display element.

13. The method of claim 12, further comprising capturing the user image data with a camera that is coupled to or integrated into the head mounted display apparatus.

* * * * *